Figure 2:
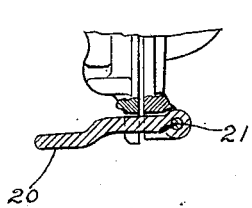

March 31, 1925.

M. A. BARBER

INTERCHANGE DEVICE

Filed Sept. 30, 1920

1,531,726

Inventor

Martin A. Barber

By Bates & Macklin
Attorneys

Patented Mar. 31, 1925.

1,531,726

UNITED STATES PATENT OFFICE.

MARTIN A. BARBER, OF CLEVELAND, OHIO, ASSIGNOR, BY MESNE ASSIGNMENTS, TO THE AMERICAN AUTOMATIC CONNECTOR COMPANY, OF WYOMING, DELAWARE, A CORPORATION OF DELAWARE.

INTERCHANGE DEVICE.

Application filed September 30, 1920. Serial No. 413,878.

*To all whom it may concern:*

Be it known that I, MARTIN A. BARBER, a citizen of the United States, residing at Cleveland, in the county of Cuyahoga and State of Ohio, have invented a certain new and useful Improvement in Interchange Devices, of which the following is a full, clear, and exact description, reference being had to the accompanying drawings.

This invention relates to connectors for coupling train pipes and particularly to a lock for an interchange device whereby the conduits of an automatic connector on one car may be securely coupled with the conduits of another car not equipped with an automatic connector.

One form of automatic connector, which has been demonstrated to be efficient, has a spring pressed head supported by the train coupler and provided on one side with a projection and on the other with a recess. Such a connector is shown for instance in Patent No. 1,161,403, granted November 23, 1915 to A. L. Moler and his assignees. When two cars are equipped with two automatic connectors the projection of each head enters the recess of the other, centering the heads and causing gaskets around the train pipe orifices carried by the heads to come into abutting engagement to establish air tight communication.

When one car is provided with such an automatic connector and the other car coupled to it has simply the usual hand connectors on the train pipe, an interchange device adapted to be connected to both the automatic and the hand connectors is required. The interchange device shown comprises an apertured body secured to the connector head in such manner that it may be swung back into idle position when both cars are equipped with automatic connectors and which may be swung forward over the face of the connector head to supply the equivalent of the usual train pipe connection for use whenever the other car is not equipped with the automatic connectors.

My invention comprises the combination with an interchange orifice-block of means whereby it may be secured in air tight engagement to the face of an automatic connector in such manner that one or more hand connectors carried by it may thus be maintained in communication with corresponding conduits of the automatic connector. Thus the interchange may be made whenever desired by simply swinging the device onto the face of the connector head and securing it by the locking means comprised in my invention, while when the interchange is not desired this locking means may be readily released and the device swung back to idle position.

My interchange device is hereinafter more fully explained in connection with the drawings and its essential features are summarized in the claims.

Figure 3:
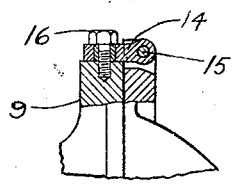
Figure 4:
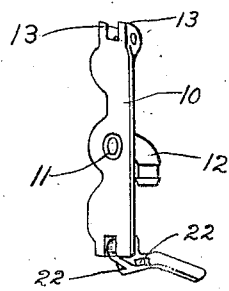
Figure 1:
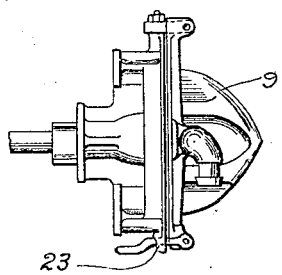
Figure 5:
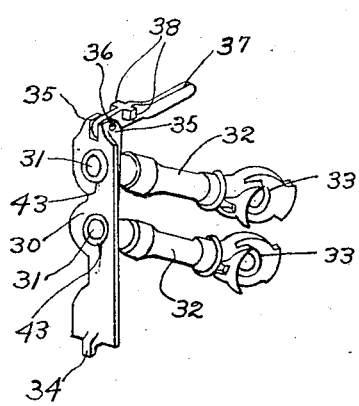
Figure 6:
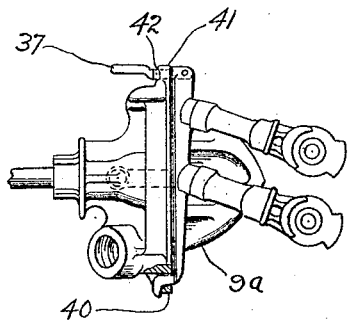

In the drawings, Fig. 1 is a side view of an automatic coupler head, having my interchange device in position thereon; Fig. 2 is a sectional view showing a portion of a connector head having the device shown in Fig. 1; Fig. 3 is a sectional view showing a hinge connection between the interchange device and the connector head; Fig. 4 is a perspective view of the interchange body having my locking means thereon; Fig. 5 is a perspective view of the modified interchange; Fig. 6 is a side view of a connector head showing the modified interchange device in position thereon.

The interchange device as illustrated in Figs. 1 to 4 comprises a body 10 having an orifice 11 in the face thereof with a conduit 12 extending therefrom and adapted to be connected with the end of a hose. The body may have lugs 13 at one end adapted to embrace a clevis like member 14 to which it is shown as pivoted by pin 15 extending transversely through the lugs and on one end of the member 14. The opposite end of the member 14 may have an opening therethrough at right angles to the pivot 15, whereby it may be swiveled on the top of the connector head 9 as by a screw 16. Thus, the two pivot members 15 and 16 constitute a universal joint connection between the interchange device and the connector head.

My improved locking means for the interchange device further comprises a latch bar 20 having one end thereof pivoted on a pin 21 extending transversely through the lower bifurcated end of the interchange body. Intermediate the ends of the bar 20, laterally projecting clamping lugs 22 are located, and are adapted to be cammed over the slightly enlarged ends of the two spaced lugs 23 on an adjacent portion of the connector head. The reduced portion of these lugs 23 between the enlarged ends and the body of the connector head receive the lateral lugs 22, and are sufficient to hold them securely, thus maintaining the interchange body in locked position until the latch member 20 is bodily swung about the pivot 21 to release the device.

With my improved locking device the interchange body 20 may be readily connected to or disconnected from the automatic connector head and may be securely held thereagainst during operation. When the interchange device is no longer equipped with automatic connectors the latch member 20 may be released as described above, and the interchange body may be swung about its pivots 15 and 16 and placed in such position that it will not interfere with the operation of the connector head.

To permit the connection of two cars, one of which is provided with the usual hand coupling and the other of which is provided with an automatic connector, I have illustrated, particularly in Figs. 5 and 6 a modified form of interchange device which comprises a body part 30, having a plurality of orifices 31 in the face thereof, and a conduit 32 communicating with each orifice, and being provided with couplings 33 for connection with the usual hand connector. The body may be provided at one end thereof with a lug 34, while the other end may have a pair of spaced lugs 35 adapted to receive a pivot pin 36 for a locking bar 37, the latter having a pair of oppositely disposed lugs 38. The connector head 9ª is shown as provided with an aperture 40 adjacent one side thereof, to receive the lug 34 on the interchange device. The opposite end of the connector head may be provided with a pair of spaced lugs 41, each having a shoulder on the rear surface thereof.

In securing the modified form of interchange device in place, the lug 34 is first inserted into the aperture 40, and the face of the interchange device is then brought into position in front of the face of the coupler head. The locking bar 37 is then swung about the pivotal connection 35 so as to bring the lugs 38 thereon behind the shoulders 42. The shoulders may be inclined to provide a camming action which operates to force gaskets 43 carried by the interchange device into fluid-tight engagement with the gaskets carried by the connector head.

In the modification of my invention, I have shown but two orifices in the interchange device, but if desired a greater or less number could be used.

From the foregoing description, it will be apparent that I have provided an interchange device which is simple in construction, and which could be readily applied to a connector head, or removed therefrom. Moreover, it will be apparent that I have provided a device which has few working parts and which will be durable in use.

Having thus described my invention, I claim:—

1. In a train pipe connector, the combination with a coupler head having a lug integral therewith, said lug having a cam surface on the rearward side thereof, of an interchange device comprising a body having a train pipe orifice therein, and having a hand connector communicating with said orifice, means for movably connecting said body to the end of the head opposite the lug, and a lever pivoted to the interchange device and having a laterally extending lug providing a cam surface which cooperates with the cam surface on the first-mentioned lug for removably securing the interchange device to said head.

2. In a train pipe connector, the combination with a coupler head having a pair of lugs projecting from the bottom thereof and behind the meeting face of the connector, each of said lugs providing a cam surface on the rearward side thereof; of an interchange device comprising a body having a train pipe orifice therein and having a hand connector communicating with said orifice, means for securing said body by a universal joint to the side of the connector head opposite the lug, a hand lever pivoted to the body, and having a pair of laterally projecting lugs disposed on opposite sides of the lever, said lugs being adapted to cooperate with the lugs on the head for locking the body thereto.

In testimony whereof, I hereunto affix my signature.

MARTIN A. BARBER.